United States Patent
Souza (10) Patent No.: US 11,969,120 B2
(45) Date of Patent: Apr. 30, 2024

(54) FOOD PROCESSOR AND ATTACHMENT

(71) Applicant: Richard De Souza, Unionville (CA)

(72) Inventor: Richard De Souza, Unionville (CA)

( * ) Notice: Subject to any disclaimer, the term of this patent is extended or adjusted under 35 U.S.C. 154(b) by 429 days.

(21) Appl. No.: 17/023,507

(22) Filed: Sep. 17, 2020

(65) Prior Publication Data

US 2022/0031120 A1 Feb. 3, 2022

(30) Foreign Application Priority Data

Jul. 28, 2020 (CA) .................. CA 3088183

(51) Int. Cl.
| | | |
|---|---|---|
| A47J 43/07 | (2006.01) | |
| A47J 43/044 | (2006.01) | |
| A47J 43/046 | (2006.01) | |

(52) U.S. Cl.
CPC ......... *A47J 43/0722* (2013.01); *A47J 43/046* (2013.01); *A47J 43/07* (2013.01); *A47J 43/044* (2013.01); *A47J 43/0705* (2013.01)

(58) Field of Classification Search
CPC ........ A47J 43/044; A47J 43/046; A47J 43/07; A47J 43/0705; A47J 43/0722
See application file for complete search history.

(56) References Cited

U.S. PATENT DOCUMENTS

| | | | |
|---|---|---|---|
| 656,123 A | | 8/1900 | Kempf |
| 2,577,916 A | | 12/1951 | Rollman |
| 3,780,536 A | | 12/1973 | Fishman et al. |
| 4,312,596 A | * | 1/1982 | Maezawa ............ B01F 27/1125 366/343 |
| 4,878,627 A | | 11/1989 | Otto |
| 4,885,917 A | * | 12/1989 | Spector .................. A23G 9/045 62/343 |
| 4,891,966 A | | 1/1990 | Kramer |
| 5,823,672 A | * | 10/1998 | Barker ................ A47J 43/0722 366/205 |
| 7,641,380 B2 | | 1/2010 | Behar et al. |
| D623,890 S | | 9/2010 | Metaxatos et al. |
| 8,702,300 B2 | | 4/2014 | Audette |
| 9,549,639 B2 | | 1/2017 | Garr |
| 10,349,781 B2 | * | 7/2019 | Riede .................... F16D 41/185 366/205 |

(Continued)

FOREIGN PATENT DOCUMENTS

| | | | | |
|---|---|---|---|---|
| DE | 3545420 C1 | * | 3/1987 | ............ A47J 43/046 |
| EP | 2445636 B1 | | 8/2014 | |
| KR | 20120118136 A | * | 10/2012 | ............ A47J 43/046 |

*Primary Examiner* — Debra M Sullivan
*Assistant Examiner* — Matthew Stephens (57) ABSTRACT

Provided is a food processor and an attachment for a food processor. The attachment having a substantially S-shaped vertical rotational member having an upper end and a lower end, the lower end of the rotational member configured for secure engagement to a base motor. There is also a first blade assembly attached to a lower portion of the rotational member, the first blade assembly having at least one upward-angled blade, and a second blade assembly attached to an upper portion of the rotational member, the second blade assembly having at least one downward-angled blade. The first blade assembly and second blade assembly are disposed along the rotational member such that the first blade assembly and second blade assembly offset one another along the height and width of the housing.

10 Claims, 9 Drawing Sheets

(56) References Cited

U.S. PATENT DOCUMENTS

| | | | |
|---|---|---|---|
| 2005/0167537 A1* | 8/2005 | Chen | ........................ B02C 18/18 |
| | | | 241/292.1 |
| 2005/0193896 A1 | 9/2005 | McGill | |
| 2008/0314215 A1* | 12/2008 | Gursel | ................ A47J 43/0722 |
| | | | 83/356.3 |
| 2010/0071219 A1* | 3/2010 | Lin | ..................... A47J 43/0722 |
| | | | 30/303 |
| 2010/0170404 A1 | 7/2010 | Hensel et al. | |
| 2011/0248108 A1 | 10/2011 | Carriere | |
| 2018/0213980 A1 | 8/2018 | Cody et al. | |

* cited by examiner

FOOD PROCESSOR AND ATTACHMENT

CROSS REFERENCE TO RELATED APPLICATION

This application claims the benefit of Canadian Patent Application No. 3088183 filed on Jul. 28, 2020, which is hereby incorporated by reference herein in its entirety.

TECHNICAL FIELD

Food processors, mixers and blenders.

TECHNICAL BACKGROUND

Typical food processors, mixers and blenders include a clear housing to receive food for processing, a base below the housing to contain the electronics and controls, and a motor with blades attached thereto to create the physical force used to shear or otherwise process food during rotation of the blades. During this process, food is typically pushed up toward the top of the housing by the impact of the blades, and falls back down by force of gravity for further processing by the blades.

DETAILED DESCRIPTION

Summary of Invention

In an embodiment, there is disclosed a food processor having a housing for receiving and containing food to be processed, a base below the housing and a base motor. There is an attachment for mounting to the motor, the attachment having a substantially S-shaped vertical rotational member having an upper end and a lower end, the lower end of the rotational member configured for secure engagement to the motor. There is also a first blade assembly attached to a lower portion of the rotational member, the first blade assembly having at least one upward-angled blade, and a second blade assembly attached to an upper portion of the rotational member, the second blade assembly having at least one downward-angled blade. The first blade assembly and second blade assembly are disposed along the rotational member such that the first blade assembly and second blade assembly offset one another along the height and width of the housing.

In another embodiment, there is provided an attachment for a food processor having a substantially S-shaped vertical rotational member with an upper end and a lower end; the lower end of the rotational member configured for secure engagement to a base motor of the food processor. Attached to the lower portion of the rotational member is a first blade assembly having at least one upward-angled blade, and attached to an upper portion of the rotational member is a second blade assembly having at least one downward-angled blade. The first blade assembly and second blade assembly are disposed along the rotational member such that the first blade assembly and second blade assembly offset one another along the height and width of the housing of the food processor.

In some embodiments, there may be a third blade assembly mounted below the first and second blade assemblies. The third blade assembly may also have upward angled blade(s), similar to the first blade assembly. The third blade assembly may form part of the base motor, or be mounted on the rotational member itself.

In other embodiments, the food processor may further include a lid having an aperture on its lower surface which is designed to rotationally engage the upper end of the rotational member. In other embodiments, the rotational member may be further reinforced through at least one vertical reinforcement member, which may be mounted between the upper end of the rotational member and the lower end of the rotational member.

The foregoing summary is not intended to summarize each potential embodiment or every aspect of the subject matter of the present disclosure. These and other aspects of the device are set out in the claims, which are incorporated here by reference.

BRIEF DESCRIPTION OF DRAWINGS

Embodiments will now be described with reference to the figures, in which like reference characters denote like elements, by way of example, and in which.

EMBODIMENTS

Immaterial modifications may be made to the embodiments described here without departing from what is covered by the claims.

Figure 1:
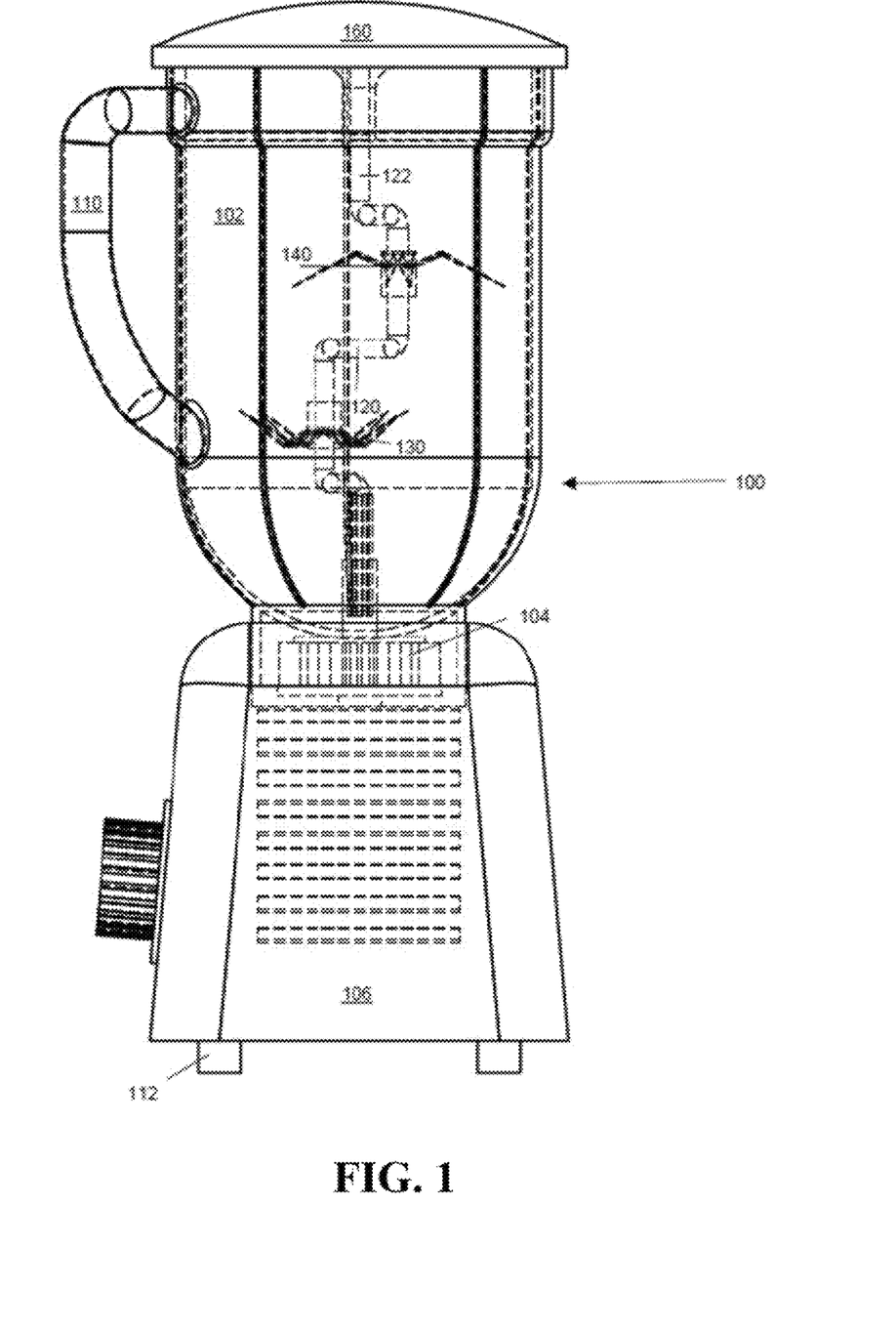
FIG. 1 is a side view of a food processor, according to one embodiment.
Figure 2:
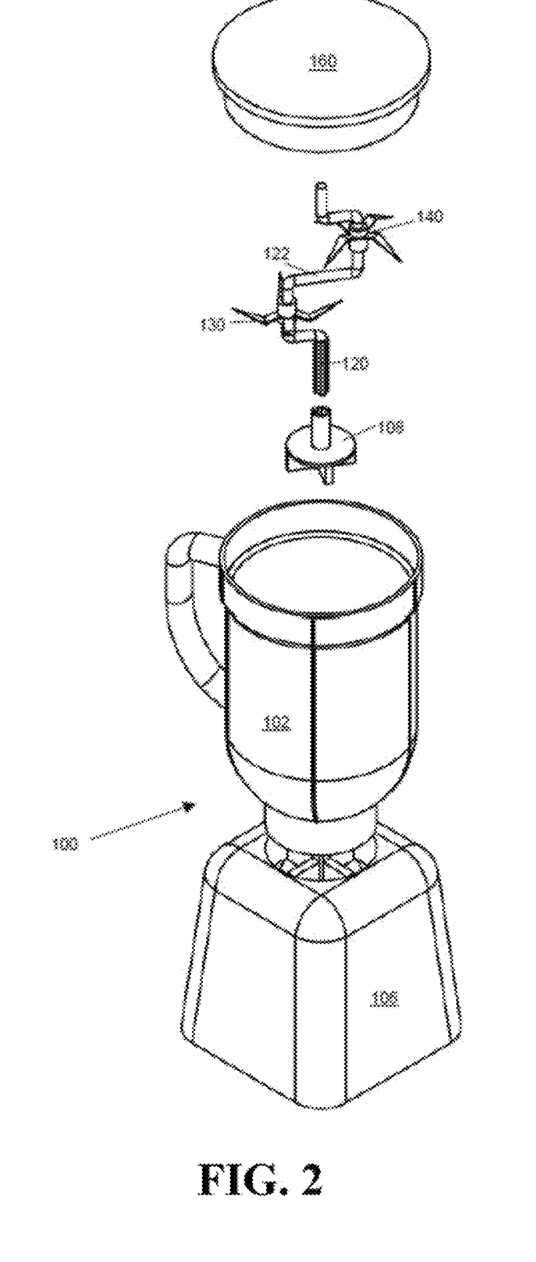
FIG. 2 is an exploded perspective view of the food processor of FIG. 1.

Shown in FIG. 1 is a side view of a food processor according to one embodiment. As individually shown in FIG. 2, the food processor 100 includes a bottom base 106, a housing 102 which receives and contains the food to be processed, an electrical base motor 104 attached to the base 106 and disposed within the interior bottom portion of the housing 102. According to this embodiment, there is provided an attachment 120 comprising an S-shaped rotational member 122, and two blade assemblies 130 and 140 mounted to the rotational member 122 such that they offset each other and cover a greater distance along the width of the base 106. In some embodiments, there may also be a lid 160 to seal the upper opening of the housing 102. As shown in FIG. 2, there may also be an intermediate adapter 108 to bridge the connection between rotational member 122 to the base motor 104.

The housing 102 may be composed of a transparent plastic or glass material as found in conventional food mixers, blenders or food processors. It allows a user to see through the device as food is being processed within. In this embodiment, the S-shaped rotational member 122 runs along the entire length of the housing 102, connecting to the base motor 104. In some embodiments, the rotational member 122 may be securely received by an aperture within the bottom surface of the lid 160. In some embodiments, the housing 102 may have a handle 110 molded to the exterior to allow the user to properly and securely handle the housing 102.

Base 106 of the device houses electronics (not shown) used to control and drive the central motor 104. The base 106 may have control means such as a knob or buttons to control the intensity or speed of the motor 104 to allow a user operational variety depending on the food to be processed. The base may also have other optional features such as legs 112 for better stability or grip on a flat surface.

The central motor 104 rotates along the x-axis, and provides the rotational energy used to rotate the attachment 120 which includes the rotational member 122 and the two blade assemblies 130 and 140. As described above, the motor 104 may be controlled through knobs or buttons found on the housing, or even through a remote control device if available.

Figure 3:
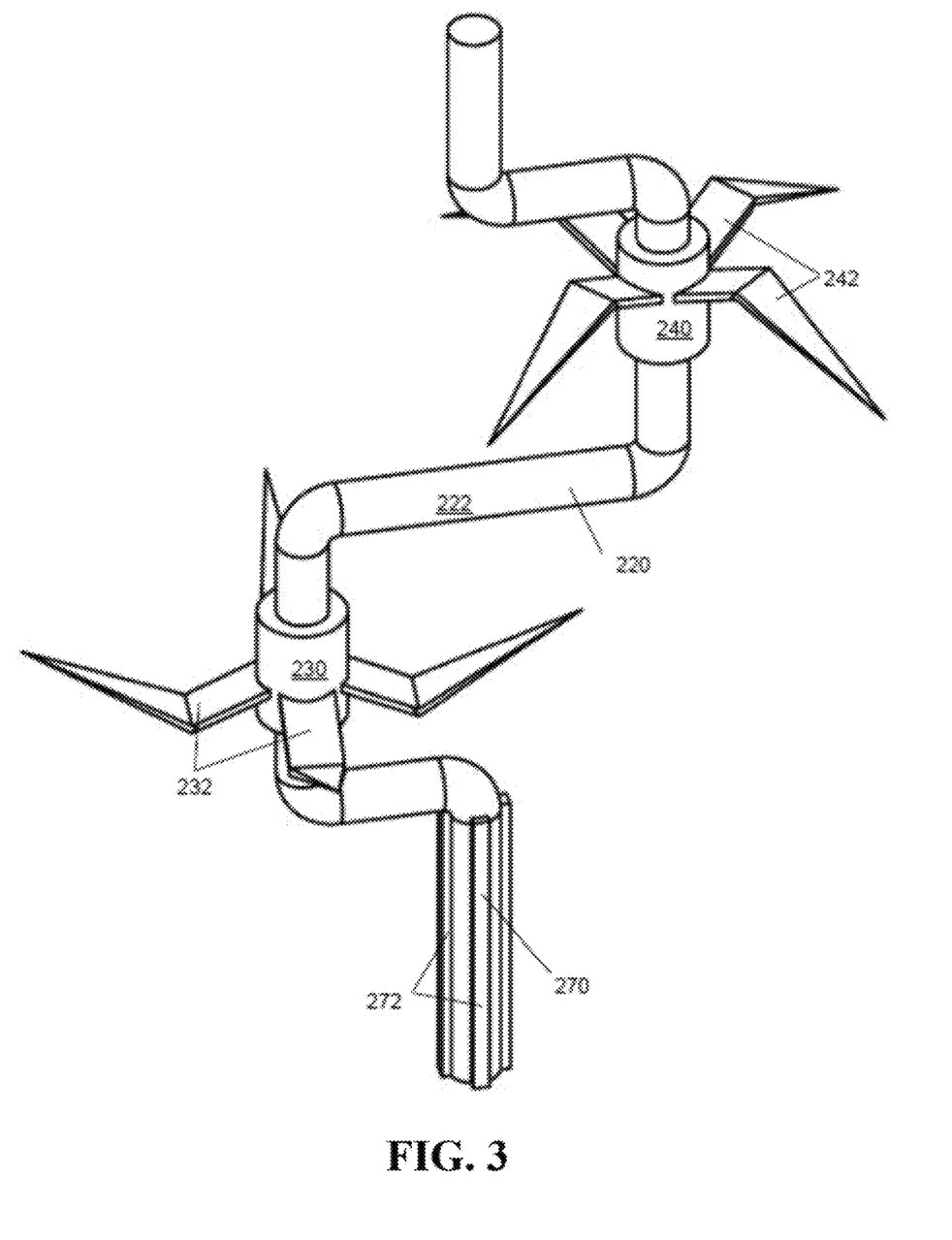
FIG. 3 is a perspective view of an attachment for a food processor, according to another embodiment.

Shown in FIG. 3 is a close-up perspective view of an attachment 220 for a food processor, according to another embodiment. The attachment may include an S-shaped rotational member 222 which extends along the entire height of the housing of a food processor. The shape of the rotational member 222 allows for a greater area to be covered by its rotation, and also acts to provide additional reciprocal horizontal force similar to a crankshaft.

As shown in FIG. 3, mounted near the lower portion of the rotational member 222, and at one bottom corner of the "s" shape, is a first blade assembly 230. The blades 232 on the blade assembly 230 may be fixed (i.e., no independent rotation) or rotatable through a separate motor within the rotational member. The first blade assembly 230 may have a plurality of upward-angled blades 232, which have the effect of driving up food that the blades come into contact with.

Mounted above and diagonally across the first blade assembly 230 and at the upper portion of rotational member 222 is a second blade assembly 240. The position of the second blade assembly 240 allows it to offset against the first blade assembly 230 to cover a greater processing area, both vertically and horizontally, during rotation of the rotational member 222. Like the first blade assembly 230, the blades 242 on the second blade assembly 240 may be fixed or independently rotatable. In this embodiment, the second blade assembly 240 may include blades 242 which are angled downward. This downward angle of blades 242 will have the effect of driving down food which has been pushed up by the first blade assembly 230 and blades 232. This combination of an upward force driven by the first blade assembly 230 along with a downward force caused by the second blade assembly 240 creates an additional compacting force against the food to be processed, which in turn further increases the efficiency and speed of processing. In addition, instead of waiting for food to fall by force of gravity as found in conventional food processors, the process is sped up through the downward force on the food created by the blade assembly 240. Bottom end 270 of the rotational member 222 may include a plurality of protrusions or grooves 272 designed to securely engage apertures on the base motor of a food processor.

Figure 4:
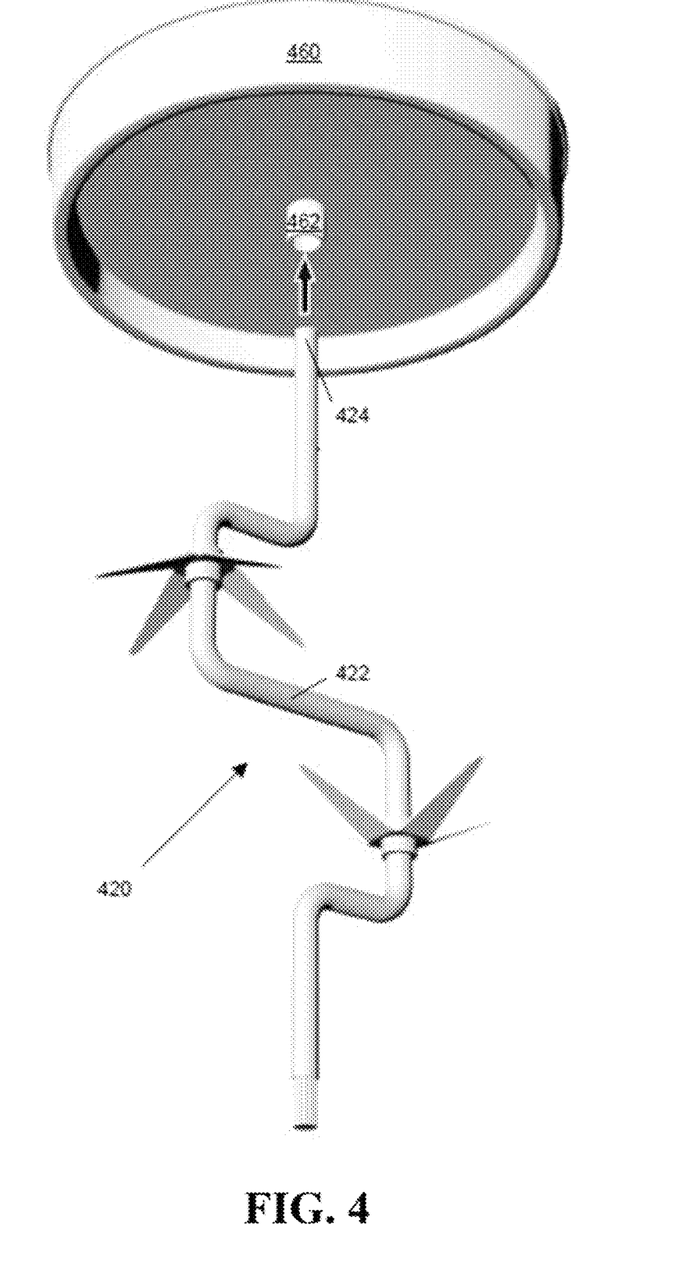
FIG. 4 is a below-level perspective view of an attachment for a food processor and a lid of a food processor, according to another embodiment.

FIG. 4 is a below-level perspective view of an attachment 420 and a lid 460 for a food processor, according to another embodiment. In this embodiment, the bottom surface of the lid 460 comprises an aperture 462 for receiving the upper end 424 of the rotational member 422. This prevents the rotational member 422 from bending or rotating off-axis in situations where the food may be hard or otherwise difficult to process. As the lid 460 itself should not rotate during use, the aperture 462 on the lid should allow for free rotation of the rotational member 422 while securing it in place. One way to achieve this result is to have the upper end 424 of the rotational member 422 form a circular cross-section, and to have a circular aperture 462 on the lid 460 corresponding to that circular cross-section, which allows rotational but not fixed engagement between the rotational member 422 and lid 460.

Figure 5:
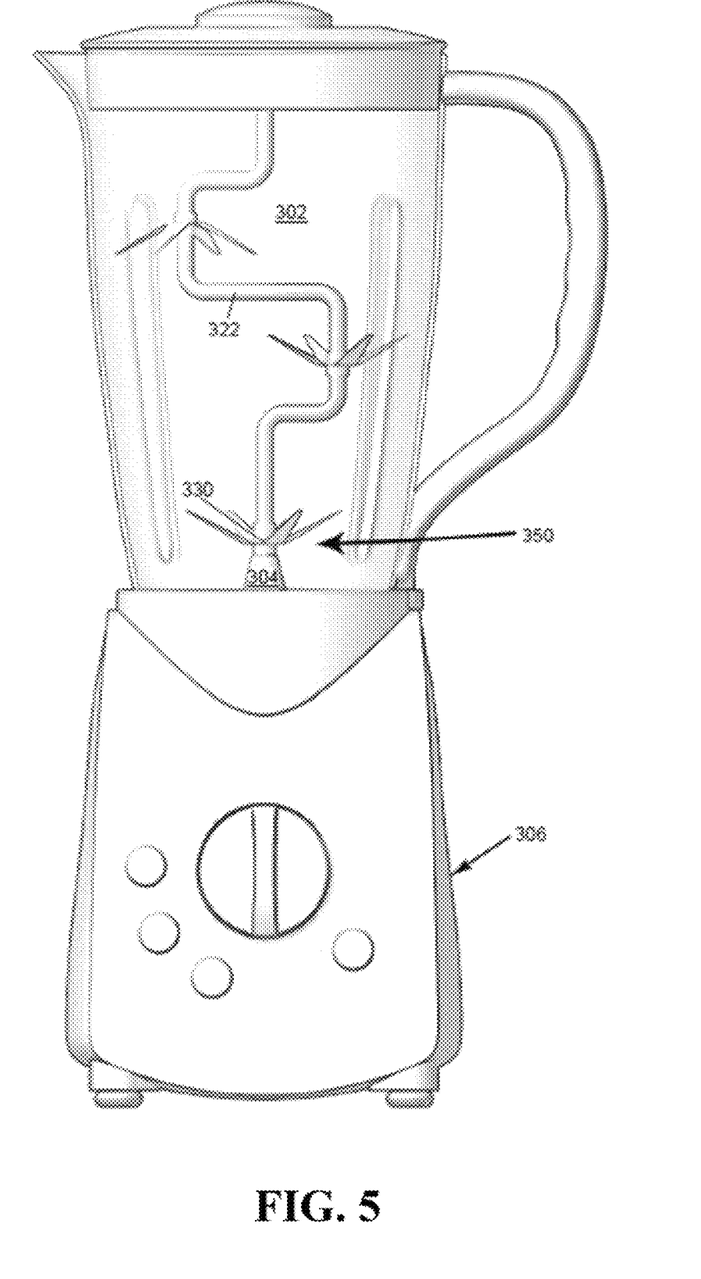
FIG. 5 is a side view of a food processor, according to another embodiment.

As shown in FIG. 5, in certain embodiments, there may be an additional, third blade assembly 350 which is mounted directly on or in close proximity to the base motor 304. The addition of this third blade assembly 350 provides an extra rotational force near the bottom of housing 302 and above base 306 to capture any food which may have fallen below the first blade assembly 330 during rotation and may have remained unprocessed. The third blade assembly 350 may also have upward angled blades to create the upward driving force, which pushes the food up toward the first or second blade assemblies. The third blade assembly 350 may form part of the rotational member 322, or alternatively be separately attached to the base motor 304.

Figure 6:
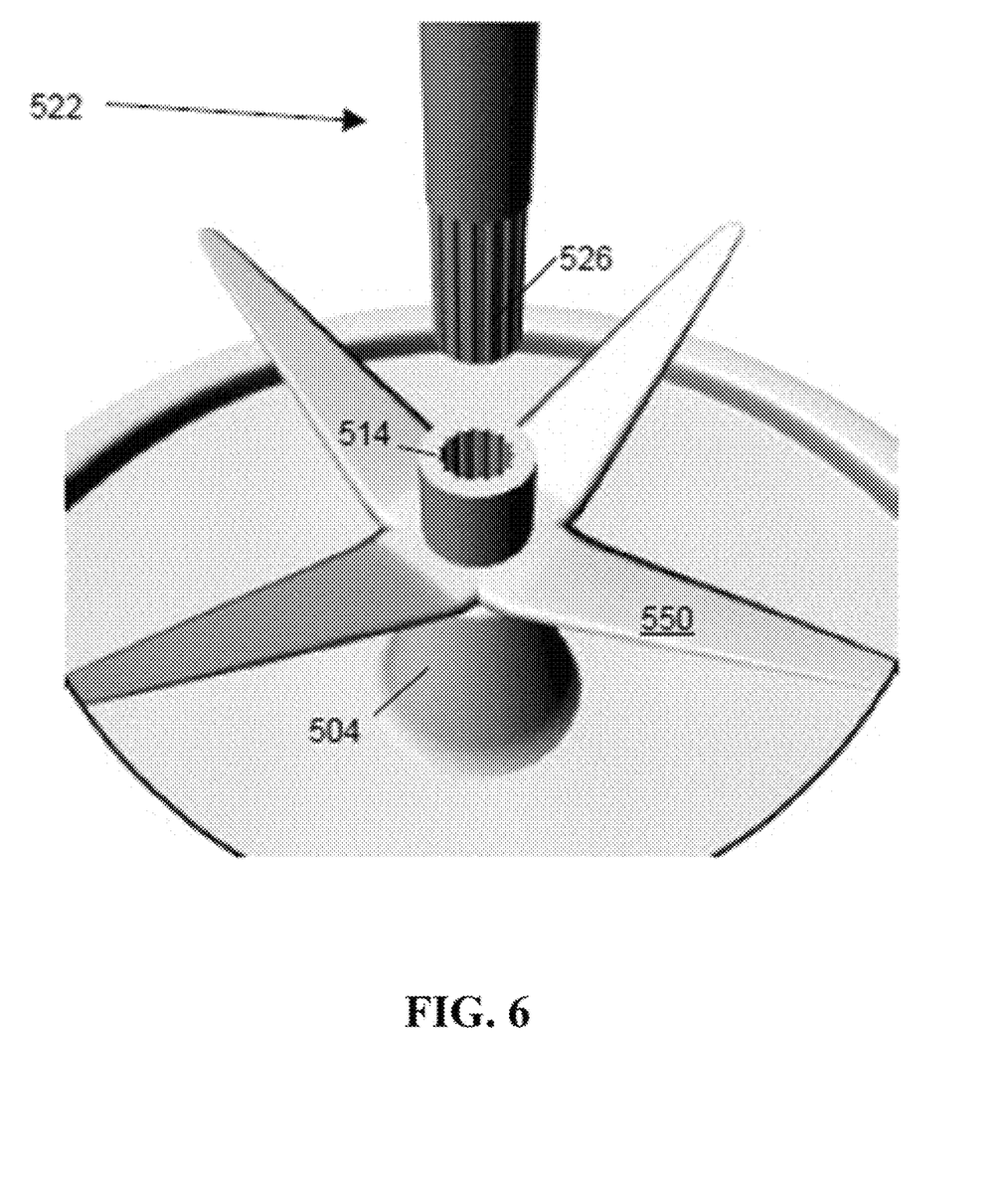
FIG. 6 is a close-up view of the lower end of an attachment for a food processor together with a base motor having a blade assembly, according to another embodiment.
Figure 7:
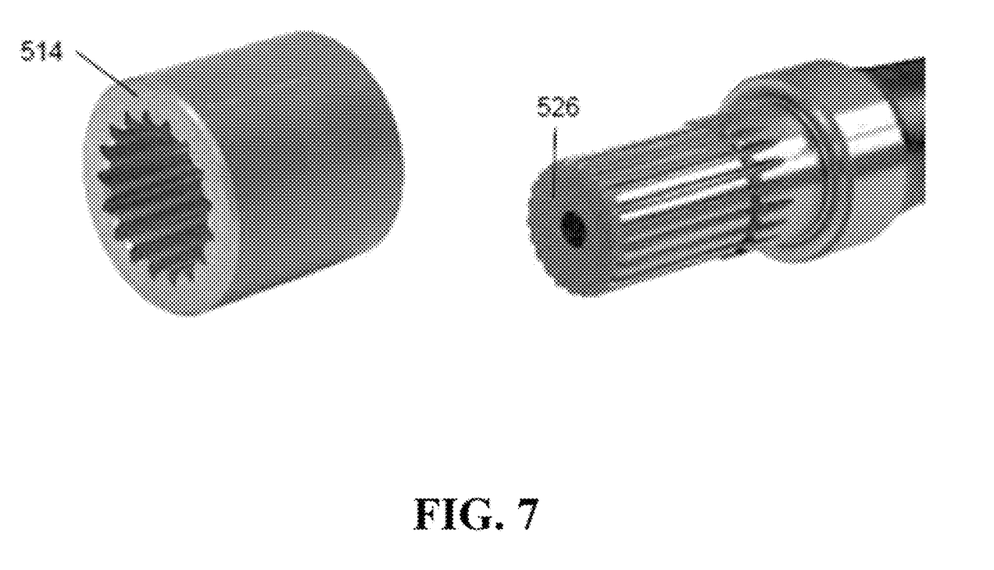
FIG. 7 is a perspective view of a shaft and coupling mechanism, according to yet another embodiment.

FIGS. 6 and 7 show examples of connection means between the base motor and the lower end of the rotational member. As shown in FIG. 7 is an example of a female spline aperture 514 as found in the centre of the base motor 504 in FIG. 6, and a corresponding male spline shaft 526 found on the lower end of rotational member 522. Male spline shaft 526 securely engages female spline aperture 514 such as to provide a secure engagement and prevent any independent rotation between base motor 504 and the rotational member 522. An optional third blade assembly 550 may be attached to base motor 504. Note that this is only example of the connection between the motor and the rotational member, and that other shapes, combinations or means may be used as long as they allow for secure engagement between the base motor and the rotational member. Through the securing mechanism described, attachment 520 may be adapted to work as a standalone unit with existing blenders on the market, through an intermediate or conversion assembly mounted to the top of a motor which includes an aperture 514 adapted to receive the lower end of a rotational member 522, as that shown in FIG. 6. This may be particularly useful for existing food mixer systems which already allow for exchangeable bottom blade units.

Figure 8:
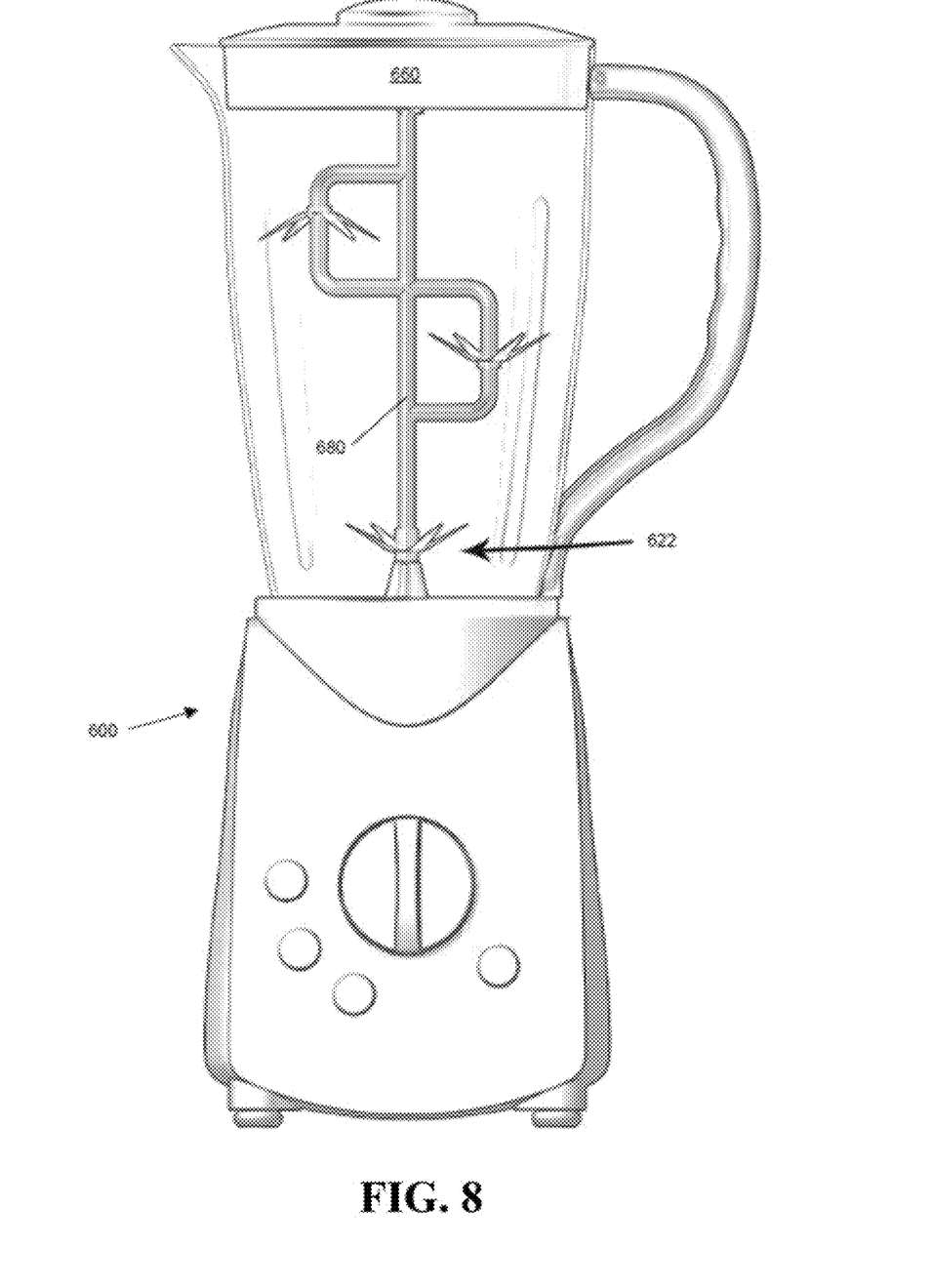
FIG. 8 is a front view of a food processor, according to another embodiment.
Figure 9:
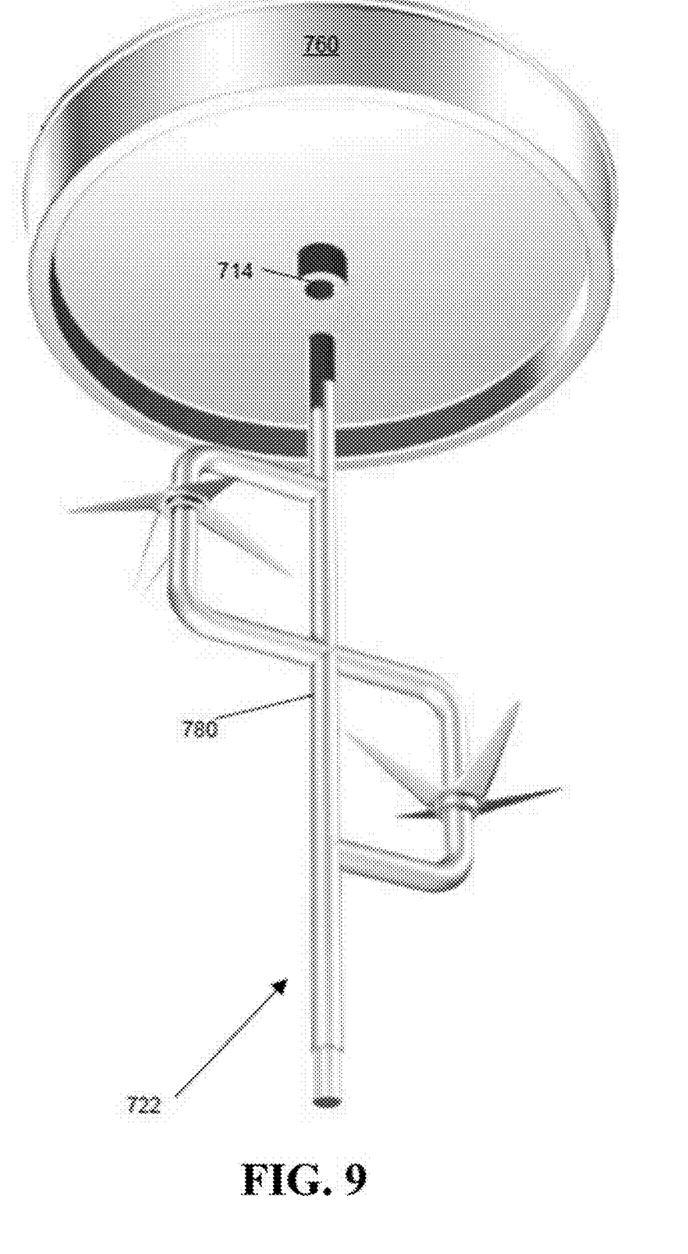
FIG. 9 is a below-level perspective view of an attachment and lid for a food processor, according to another embodiment.

Another optional feature may include reinforcing the strength of the rotational member by means of vertical reinforcement members, such as by way of a single, solid shaft molded or otherwise attached to the centre of the rotational member. The reinforcement may prevent the rotational member from bending or otherwise moving during the blending process, and can potentially increase overall lifespan of the rotational member. Shown in FIG. 8 is an exemplary food processor 600 where the rotational member 622 is reinforced through a single vertical shaft 680, and shown in FIG. 9 is a rotational member 722 with vertical shaft 780 as it attaches to a lid 760 through an aperture 714 as described through the means set out above in paragraph 26.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

What is claimed is:

1. A food processor comprising:
   a housing for receiving and containing food to be processed;
   a base arranged below the housing in a first direction;
   a motor mounted on the base and arranged below the housing in the first direction; and
   an attachment provided in the housing and coupled to the motor, wherein the attachment includes:
   a rotational member which is in a S-shape and extends in the first direction, wherein the rotational member has an upper end and a lower end, wherein a center axis of the rotational member extends in the first direction from the upper end to the lower end, wherein the lower end of the rotational member is engageable to the motor;
   a first blade assembly attached to a lower portion of the rotational member and spaced apart from the center axis of the rotational member by a first distance in a second direction, wherein the second direction is perpendicular to the first direction, the first blade assembly having at least one upward-angled blade; and
   a second blade assembly attached to an upper portion of the rotational member and spaced apart from the center axis of the rotational member by the first distance in a third direction, wherein the third direction is perpendicular to the first direction and extends to the opposite direction to the second direction, the second blade assembly having at least one downward-angled blade,
   wherein the first blade assembly and second blade assembly are disposed such that the first blade assembly and second blade assembly are offset from one another either in the first direction or in the second direction,
   wherein the rotational member is in said S-shape when viewed from a fourth direction, wherein the fourth direction is perpendicular all of the first, the second, and the third directions.

2. The device of claim 1, further comprising:
   a third blade assembly mounted below the first blade assembly and the second blade assembly.

3. The device of claim 2,
   wherein the third blade assembly comprises at least one upward-angled blade.

4. The device of claim 1, further comprising:
   a lid for closing an upper opening of the housing,
   wherein the lid comprises a bottom surface,
   wherein the bottom surface of the lid comprises an aperture corresponding to a cross-section of the upper end of the rotational member.

5. The device of claim 1,
   wherein the lower end of the rotational member comprises a male spline cross-section, and
   wherein the motor comprises a corresponding female spline aperture for receiving the lower end of the rotational member.

6. The device of claim 1, further comprising:
   a vertical reinforcement member mounted between the upper end of the rotational member and the lower end of the rotational member.

7. An attachment for a food processor comprising:
   a rotational member which is in a S-shape and extends in a first direction, wherein the rotational member has an upper end and a lower end, wherein a center axis of the rotational member extends in the first direction from the upper end to the lower end;
   a first blade assembly attached to a lower portion of the rotational member and spaced apart from the center axis of the rotational member by a first distance in a second direction, wherein the second direction is perpendicular to the first direction, the first blade assembly having at least one upward-angled blade; and
   a second blade assembly attached to an upper portion of the rotational member and spaced apart from the center axis of the rotational member by the first distance in a third direction, wherein the third direction is perpendicular to the first direction and extends to the opposite direction to the second direction, the second blade assembly having at least one downward-angled blade,
   wherein the first blade assembly and second blade assembly are disposed such that the first blade assembly and second blade assembly are offset from one another either in the first direction or in the second direction,
   wherein the rotational member is in said S-shape when viewed from a fourth direction, wherein the fourth direction is perpendicular to all of the first, the second, and the third directions.

8. The attachment of claim 7, further comprising:
   a third blade assembly,
   wherein the third blade assembly comprises at least one blade mounted below the first blade assembly and the second blade assembly.

9. The attachment of claim 8,
   wherein the third blade assembly comprises at least one upward-angled blade.

10. The attachment of claim 7, further comprising:
    a vertical reinforcement member mounted between the upper end of the rotational member and the lower end of the rotational member.

* * * * *